United States Patent [19]

Laws et al.

[11] Patent Number: 5,711,175

[45] Date of Patent: Jan. 27, 1998

[54] HEAT SHIELDS FOR ROLLER TABLES

[75] Inventors: William Robert Laws, Dorking; Geoffrey Ronald Reed, Kingswood, both of United Kingdom

[73] Assignee: Encomech Engineering Services Ltd., Epsom, United Kingdom

[21] Appl. No.: 804,293

[22] Filed: Mar. 3, 1997

Related U.S. Application Data

[63] Continuation of Ser. No. 419,926, Apr. 11, 1995, abandoned.

[30] Foreign Application Priority Data

Apr. 12, 1994 [GB] United Kingdom ............ 9407566

[51] Int. Cl.$^6$ ............ B21B 27/06; B21B 37/00; B21D 37/16
[52] U.S. Cl. ............ 72/202; 72/12.2; 72/342.5; 72/342.6
[58] Field of Search ............ 72/200, 202, 342.1, 72/342.5, 342.6, 342.3, 12.2

[56] References Cited

U.S. PATENT DOCUMENTS

| | | |
|---|---|---|
| 3,344,648 | 10/1967 | Gray . |
| 4,343,168 | 8/1982 | Laws et al. ............ 72/202 |
| 4,452,587 | 6/1984 | Laws et al. ............ 72/200 |
| 4,463,585 | 8/1984 | Laws et al. ............ 72/202 |
| 4,499,746 | 2/1985 | Laws et al. ............ 72/202 |
| 4,736,608 | 4/1988 | Laws et al. ............ 72/200 |

FOREIGN PATENT DOCUMENTS

| | | |
|---|---|---|
| 887953 | 12/1971 | Canada . |
| 889615 | 1/1972 | Canada . |
| 0 005 340 | 11/1979 | European Pat. Off. . |
| 0 330 293 | 8/1989 | European Pat. Off. . |
| 0 468 716 | 1/1992 | European Pat. Off. . |

OTHER PUBLICATIONS

"Plant selection for hot strip mill upgrading: Prevention of heat loss using panels", reprinted from *Steel Times*, Sep. 1990.
Rolling, "Improved temperature distribution in a HSM using heat shields", reprinted from *Steel Times*, Jun., 1993.
"Benefits of heat conservation panels on British Steel's Ravenscraig hot strip mill", reprinted from *Iron and Steel Engineer*, 1992.
"Heat conservation during hot rolling of beams and sections: The Encoscreen", reprinted from *Iron and Steel Engineer*, Jan. 1990.
"Control of finishing temperature of Posco's No. 2 hot strip mill", reprinted from *Iron and Steel Engineer*, 1991.
"Improving hot mills from Encopanels", reprinted from *Steel Times*, Jul. 1989.

*Primary Examiner*—Lowell A. Larson
*Assistant Examiner*—Rodney A. Butler
*Attorney, Agent, or Firm*—Larson & Taylor

[57] ABSTRACT

A roller table provides a hot material path and heat insulating panels are disposed below that path, between successive rollers of the table. The panels are displaceable between a raised, operative position close to the hot material path and a lower, inoperative position in which the panel upper faces are turned away from said path. The panels remain within the width of the roller table when they are so retracted. Further heat insulating panels are displacably mounted on a frame above the path. Temperature sensing means with the top panels actuate the displacement of both the upper and lower panels.

8 Claims, 6 Drawing Sheets

HEAT SHIELDS FOR ROLLER TABLES

This application is a continuation of application Ser. No. 08/419,926 filed Apr. 11, 1995 now abandoned.

BACKGROUND OF THE INVENTION

This invention relates to arrangements of heat shields for roller tables, in particular roller tables for transporting material in hot rolling mills or steel casting plant, but it may also be applicable to other roller tables for handling hot material in slab or strip form.

It is known to provide heat insulating means around the path of hot material in slab or strip form being worked in a hot rolling mill, as illustrated in U.S. Pat. No. 4,343,168, for example, the contents of which are incorporated herein by reference. By reducing the loss of heat between stages of working the material, it is possible to increase the efficiency of operation and the quality of the final product.

In some circumstances, however, the material may be hotter than is required for the following stage of its processing yet it is not practical to limit its temperature before it leaves the preceding stage, for example, when transferring a short product run to a finishing mill. U.S. Pat. No. 4,343,168 also illustrates how the heat insulating panels disposed over the hot material path can be mounted on a frame pivoted on a longitudinal axis offset away from one side of the roller table so that in this case they can pivoted upwards clear of the roller table to leave the material exposed and so cooled by radiation.

SUMMARY OF THE INVENTION

According to the present invention, a heat shielding arrangement for hot material on a roller table comprises a plurality of heat insulating panels disposed below a material path provided by the rollers of the table and between successive rollers, said panels being displaceably mounted to be movable between a raised operative position close to the hot material path and a lower inoperative position in which the panel upper faces are retracted away from said path.

The ability to allow heat radiation downwards is limited by the structure of the conventional roller table which does not permit the lower panels to be swung away from the table and the space below the rollers is in any case limited. It has been found, however, that moving the panels further from the hot material path allows a significantly greater heat loss from that region. In particular, if the panels between successive rollers are pivotally displaceable within the width of the roller table their insulating effect can be substantially reduced because the inclination of the hot surfaces of the panels previously facing the hot material path reduces the re-radiation of heat back to said path.

In one form of the invention, the rollers are displaceable on pivot mountings having axes generally parallel to the axes of the rollers. In another form the pivot axes extend longitudinally of the roller table, e.g. opposed pairs of panels are arranged between successive rollers, mounted on respective longitudinal pivot axes at opposite sides of the roller table to extend towards each other from said opposite sides.

In a preferred arrangement of panels pivoting on axes generally parallel to the roller axes, the pivot axis of each panel is offset from the panel to be located underneath a first of the two successive rollers between which the panel is disposed and close to the periphery of said one roller. In this way, the initial pivoting of the panels can displace them in a direction approaching the vertical, thereby to reduce the clearance that must be left to allow them to clear the other of the pair of rollers between which they lie. To reduce heat loss when the lower panels are in their operative positions, a fixed auxiliary heat insulating panel may be disposed adjacent each displaceable panel, between that panel and said other roller of the pair, to extend the area shielded in the space between successive rollers.

Such fixed auxiliary heat insulating panels may be disposed close to one or both rollers of a pair of successive rollers. Although they will reduce the possible rate of heat loss from the hot material path, they will continue to shield the rollers from radiant heat when the main panel is lowered. Similar auxiliary heat insulating panels may be adopted when the displaceable panels are mounted on longitudinal pivot axes.

In their operative positions, the panels may extend generally parallel to said material path to re-radiating heat from the material on said path back to said material. It may be desirable, however, to give the top faces of each panel a moderate inclination in its operative position, in order to assist the clearance of foreign matter, such as mill scale, falling on those faces. In that case, if the panels are pivotally mounted, said inclination of each said panel top face is preferably in the direction of downward tilting of the panel. Rigid protective elements can be arranged in fixed locations close to the panels to protect them against damage by material running along the hot material path, the tops of said elements lying between the plane of said path and the top faces of the panels in their operative positions.

An arrangement according to the invention preferably also has a plurality of heat insulating panels above the hot material path which can be moved away from the path to allow heat loss similarly by radiation from the upper surfaces of the material. The employment of both upper and lower heat insulating panels which can be displaced to and from positions allowing a substantially increased rate of heat loss from hot material between them is of particular advantage in the working of thicker materials. For example, it been found that when the known arrangement of displaceable upper panels in a rolling mill is used, as the thickness of the material increases a difference can arise between the temperatures and the top and bottom surfaces of the material which is sufficiently large to affect the quality of the final rolled product. By allowing radiation heat loss from both faces of the material, this unwanted effect can be avoided or substantially reduced.

Heat sensing means may be provided to control the displacement of panels. When both upper and lower series of panels are deployed a common heat sensing means, conveniently located with the upper panels, can be arranged to control the displacement of both series of panels.

Embodiments of the invention will be described in more detail by way of example, with reference to the accompanying drawings.

DESCRIPTION OF THE PREFERRED EMBODIMENTS

Figure 1:
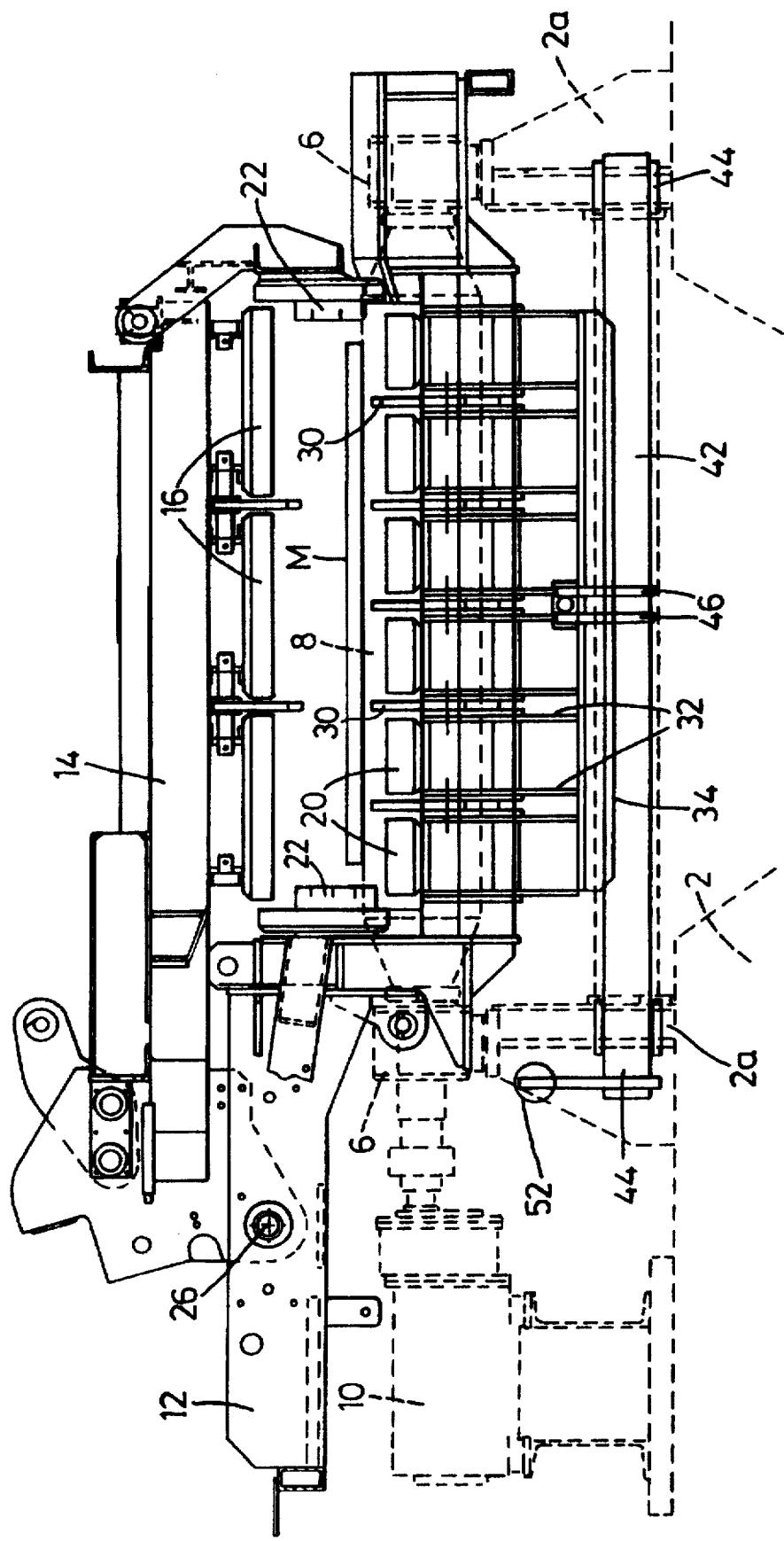
FIG. 1 is a transverse cross-section of a roller table for a hot rolling mill incorporating a heat shield arrangement according to the invention.
Figure 2:
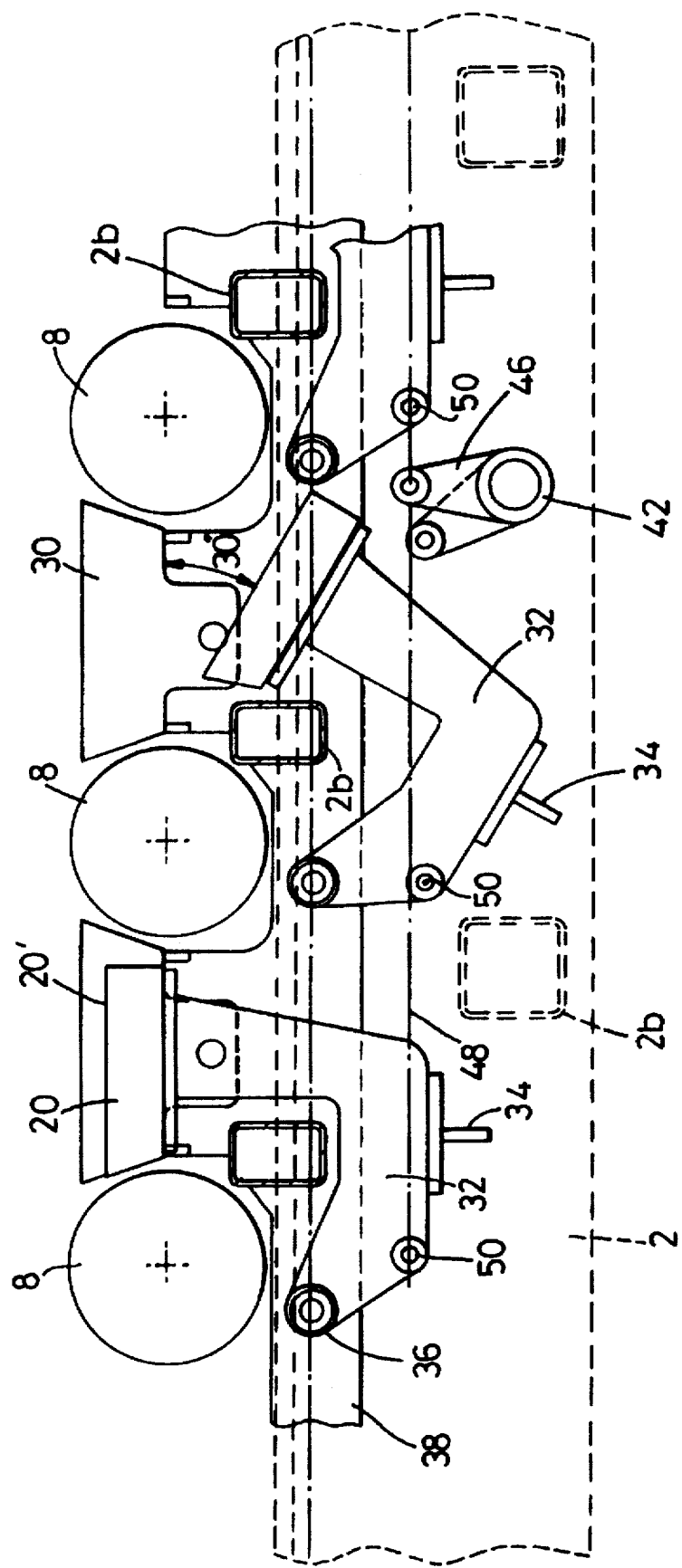
FIG. 2 is a longitudinal section of a portion of the table in FIG. 1, showing heat insulating panels in their alternative end positions.

The roller table illustrated in FIGS. 1 and 2 has a rigid base frame 2 comprising opposite side walls 2a spanned by beams 2b. Bearings 6 are provided in the side walls to support rollers 8. The top surfaces of the rollers define a travel path for hot material M longitudinally along the table, perpendicular to the plane of the drawing. The rollers are driven by motors 10 to progress the material along the travel path. A rigid structure 12 secured to one side of the base frame 2 carries an upper frame 14 extending over the roller table from which a series of upper heat insulating panels 16 are suspended to cover the table and the hot material M on it. Lower heat insulating panels 20 are arranged between the rollers 8, and between the upper and lower panels 16,20 vertical heat insulating panels 22 are mounted on the upper frame 14 to enclose the sides of the material path. All the heat insulating panels may have a thin-walled construction, generally as described in EP 005340, adapted to be heated quickly by the hot material and to radiate heat back to the material.

The upper frame 14 on which the panels 16 are mounted is pivotable about an axis 26 offset from the side of the roller table and extending longitudinally of the table. The pivoting movement swings the panels between the operative position in which they are illustrated, close to the material path, and a raised inoperative position (shown in FIG. 6) lying at a steeply inclined angle to one side of the table, in the manner described in U.S. Pat. No. 4,343,168 which also illustrates the driver means for the displacement of the upper frame.

The lower panels 20 are arranged as a series of similar laterally extending groups of narrow panels spaced across the width of the roller table. Successive panels of each group are separated by protective carry-over or bumper bars 30 which project closer to the material path than the panels so as to be able to deflect distorted material away from contact with the easily damaged panels. Each panel is supported on a pair of cranked arms 32 and the arms of each group of panels are connected by a laterally extending tie member 34. For each group of panels, the ends of the arms 32 remote from the panels 20 are attached by pivot axle 36 to a fixed support 38 running along the length of the table.

Each group of panels 20 therefore swings as a unit on its pivot axle 36, between the operative position shown to the left in FIG. 2, in which the upper faces 20' of the panels are close and parallel to the hot material path to reflect back heat radiated from the hot material, and the inoperative position, shown to the right in FIG. 2, in which the panels are lowered and tilted at an angle of about 30° away from the hot material path, so that they no longer act to maintain the temperature of the hot material. The tilting of the panels also allows any scale that may have collected on their top faces to fall from them and be removed through the roller table flume (not shown).

To displace the panels, a torque tube 42 is mounted in bearings 44 at the bottom of the base frame 2 and is connected to a motor 52. An arm 46 fixed to the torque tube is pivoted to links 48 (not shown in full) that extend in parallel horizontally along the table and are connected by pivots 50 to each laterally extending group of panels 20. When the torque tube 42 is rotated by the motor, therefore, the groups of panels tilt in unison between the alternative positions shown in FIG. 2. As the positions of the arm 46 in FIG. 2 also illustrate, a small rotation of the torque tube is sufficient to move the panels to their inoperative position, so that they can react rapidly when actuated.

Figure 3:
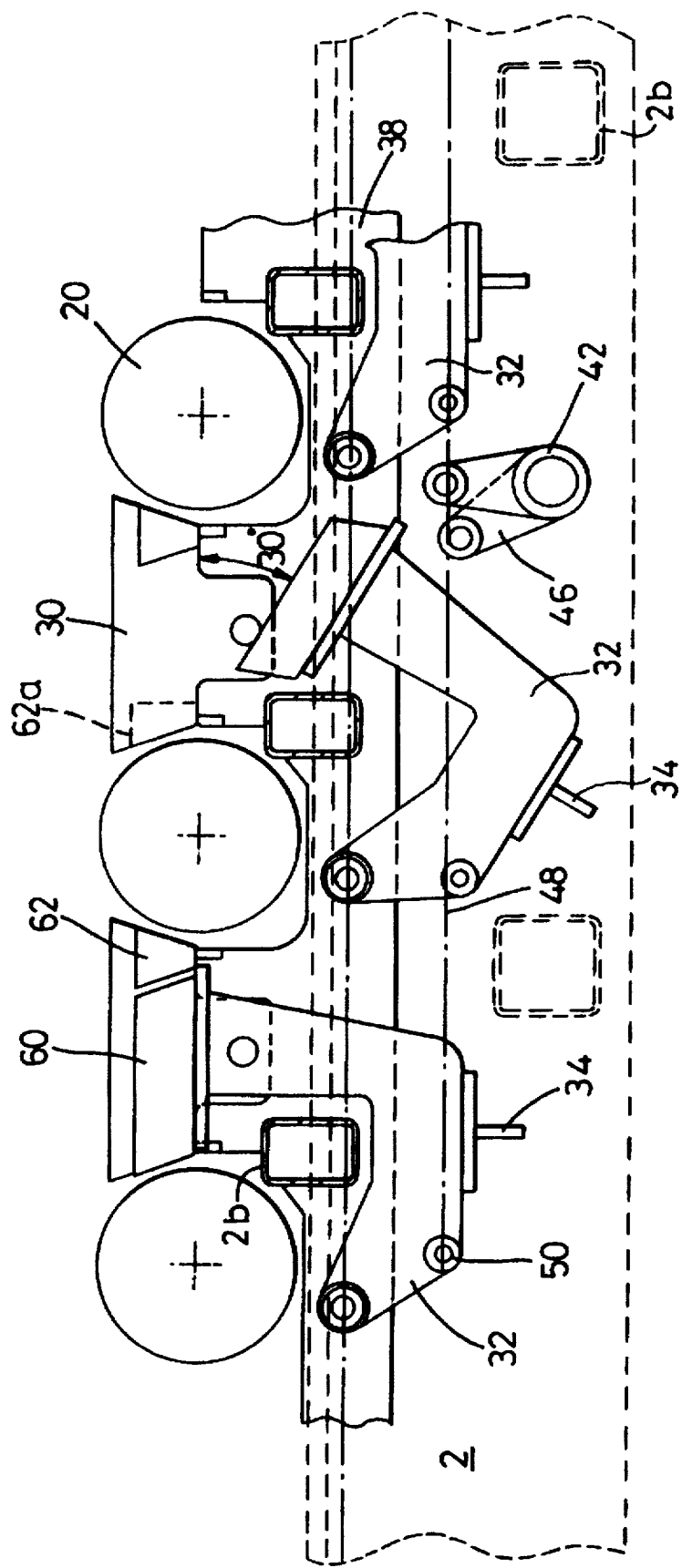
FIG. 3 is a view similar to FIG. 2 illustrating a modified arrangement of the heat insulating panels.

The location of the pivot axle 36 of each group of panels in an offset position below one of the pair of rollers between which the group of panels is located, gives the initial downward movement of the panels a direction close to the vertical. It is still necessary to provide some clearance for the movement of the panels, however and FIG. 2 indicates that there is a larger gap between panel and roller to one side of the panels than the other. This may not be significant in some installations where the length of the roller table is such that it is not necessary to provide lower heat insulating panels over the full length of the table. The reduced efficiency of insulation resulting from the shorter panels can then be compensated by deploying the panels over a greater proportion of the length of the table.

Where maximum heat insulation effect is required below the hot material path, FIG. 3 illustrates a modification to assist this purpose while employing a displacement mechanism identical to that already described. The modified arrangement is similar in all other respects to the arrangement first described and identical parts are indicated by the same reference numbers.

In this example, the distance between adjacent rollers 8 is occupied by pairs of heat insulating panels 60,62, consisting of a larger panel 60 mounted on the cranked arms 32, as before, and an auxiliary fixed panel 62 fitting closely to it, so that there is an equal narrow gap between each roller and the combined panels 60,62 in the operative position. The junction face between the main and auxiliary panels is inclined so that the gap between them can be reduced, or even eliminated in the operative position, without the risk of a clash when the displaceable main panels 60 move about their pivot axes 36.

The inclined free edges at the front and rear of the lower panels 20 or 60,62 adjoining the rollers serve a further purpose in limiting the radiation of heat to the rollers. In the modified arrangement of FIG. 3, the auxiliary fixed panels 62 maintain this effect when the displaceable panels 60 are swung down. If required, the other side of each roller can be similarly protected by relatively narrow fixed insulating panels, as indicated at 62a, so that the displaceable panels occupy a main central region between front and rear auxiliary panels.

In operation, it is of course possible to arrange that the lower panels occupy intermediate positions between the two end positions illustrated in FIGS. 2 and 3, for closer control of their insulating effect. Control means for the displacement of the panels are not illustrated in detail, but it can be arranged that the upper and lower panels 16 and 20 or 60 are displaced together, e.g. using an array of temperature sensors 66 (FIG. 6) in gaps between the upper panels only. The control means may then be arranged in the manner described in EP 005340 for the displacement of the upper panels. Alternatively with present arrangement, the sets of upper and lower panels may be operated separately by analogous control means, using inspection arrays of sensors which monitor the temperature levels of the upper and lower surfaces of the hot material independently as it passes along the table.

Figure 4:
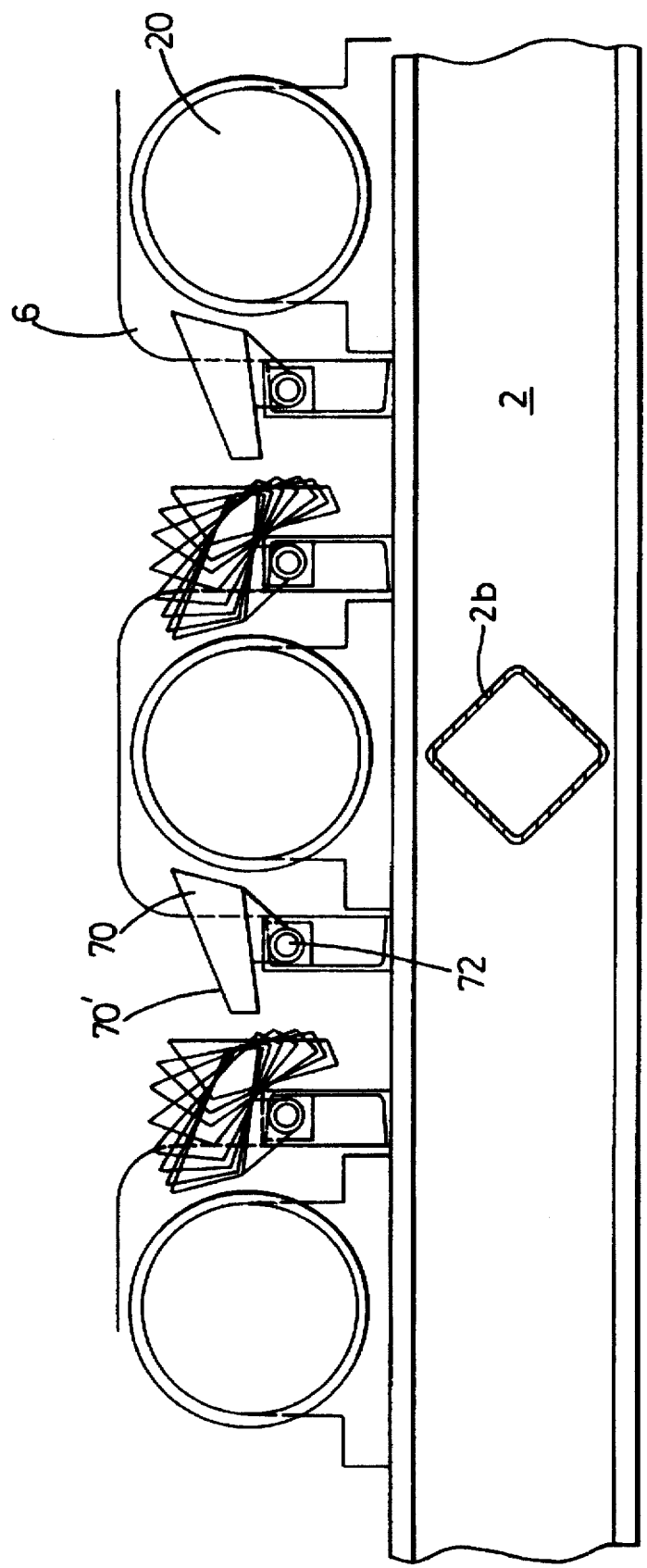
FIGS. 4 and 5 are views similar to FIGS. 2 and 3 showing another modified arrangement according to the invention, FIG. 4 illustrating the insulating panels and their displaceability and FIG. 5 illustrating their operating mechanism.
Figure 5:
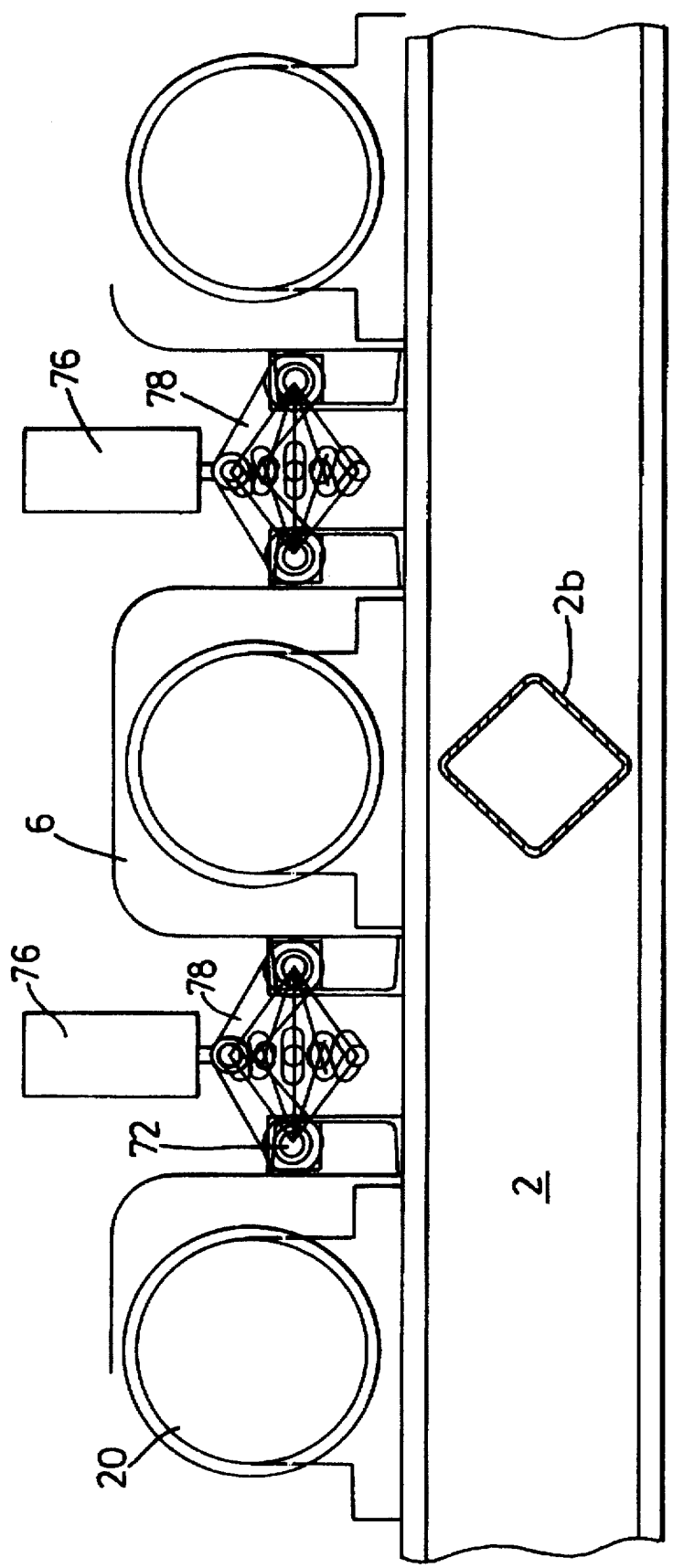

FIGS. 4 and 5 illustrate the arrangement of lower panels in a further embodiment of the invention in which parts corresponding to those already described are indicated by the same reference numbers. Groups of heat insulating panels 70 are mounted on pivot axles 72 extending across the width of the roller table below the hot material path. Between each successive pair of rollers 20, the panels 70 are disposed as mirror-image pairs on respective pivot axles 72 mounted on the base frame 2. The axles 72 are rotated oppositely to each other to displace the panels between operative and inoperative positions, as indicated in FIG. 4. The movement is generated by fluid actuators 76 or the like disposed beyond the width of the roller table on the roll motor drive side. Each actuator is coupled to a pair of arms 78 secured to the respective pivot axles 72 of the groups of panels between successive rollers. Contraction and extension of the actuators 76 as shown in FIG. 5 displaces the panels in the manner as shown in FIG. 4.

As shown by the right-hand groups of panels in the groups of FIG. 4, the panel top faces 70' lie at a moderate inclination in the operative position and are tilted to increase that inclination when they are lowered. In the operative position the inclination is sufficiently small for re-radiation of heat to the hot material on the roller table but it allows at least some of the foreign matter settling on the panels to slide off them, so that the radiation efficiency of the panel can be maintained. A gap is provided between the panels of each pair for the this purpose. In a high tonnage rolling mill a substantial quantity of scale can fall onto the panels below the material path. The self-cleaning action of the inclined upper faces thus helps to preserve the efficiency of the panels and whenever more positive clearance of any scale is required the panels can be tilted to their non-operative positions.

It should be noted that although the top faces can be turned through almost 90° to their inoperative position, the oblique side faces opposite the rollers remain at a considerable angle to the material path. They do not have any substantial re-radiating effect therefore when the panels are put in the inoperative position, while in the operative position they are disposed close to the rolls to maximise their shielding effect thereon.

For simplicity, other features illustrated in the earlier drawings have not been shown in FIGS. 4 and 5, such as the bumper bars 30 to protect the panels and the inclusion of upper heat-shielding panels. Also as described earlier, instead of each set of panels between successive rollers having its own actuator 76, a larger actuator can displace a number of sets of panels through a linkage.

The examples shown so far have roller tables with closely pitched rollers (e.g. 900 mm), such as are required to support relative thin material such as hot steel strip. If the table is to operate with thicker slabs the pitch of the rollers can be increased, for example, a roller table following a slab caster may have a roller pitch some 50% greater. In that case, from the point of view of conserving heat in the material on the roller table there is less need to contour the panels to fit closely to the rollers and an arrangement of rectangular panels can be deployed in the manner shown in FIG. 6.

Figure 6:
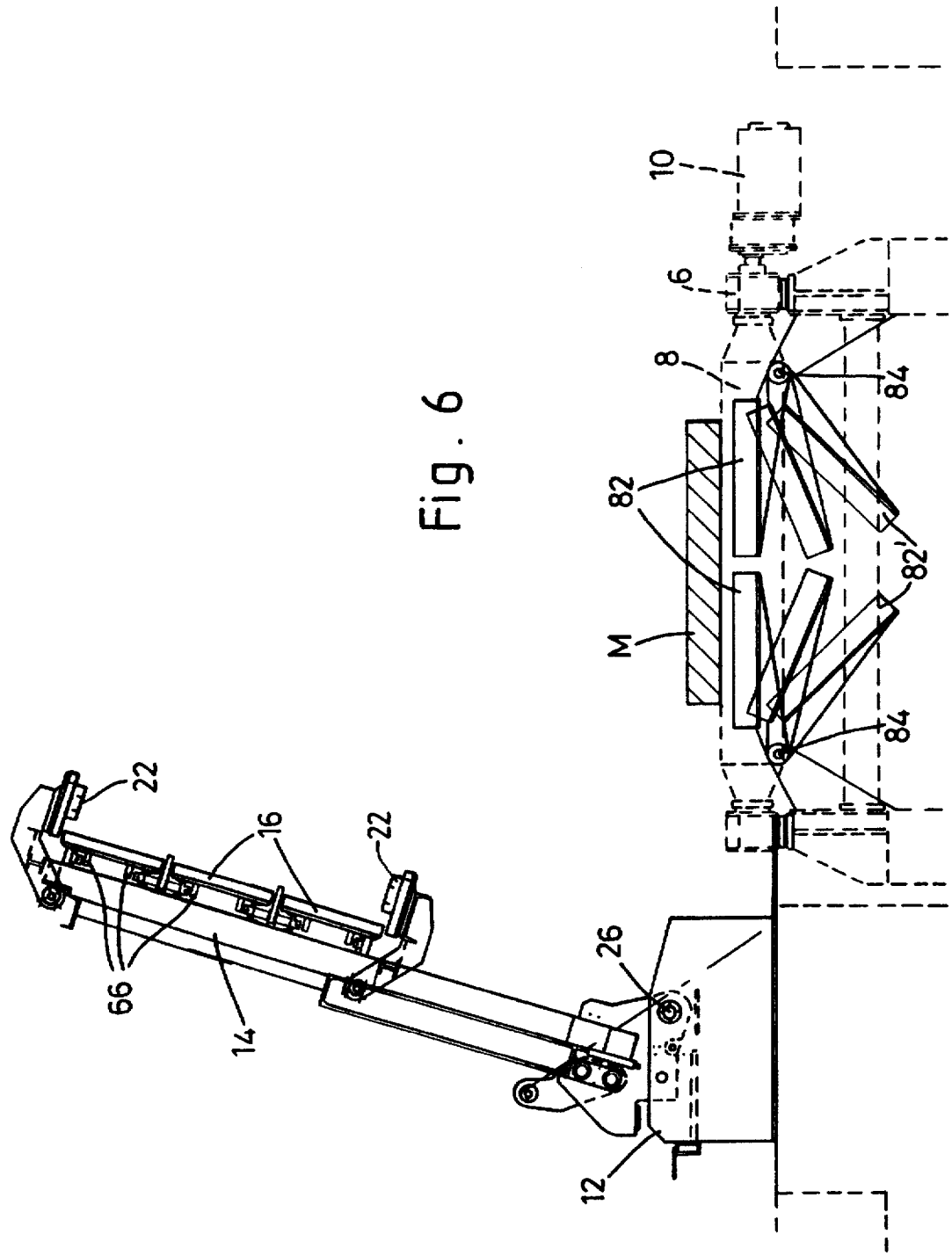
FIG. 6 is a transverse cross-sectional view of another arrangement according to the invention, showing also the upper insulating panels of FIG. 1 in their raised position.

In FIG. 6, in which parts already described are indicated by the same reference numbers again, pairs of panels 82 are provided between successive rollers. The panels are mounted at opposite sides of the roller table on pivots 84 that extend in the direction of material path and so are able to swing down to the inoperative positions indicated by the reference 82'. The means of displacement of the panels between the operative and inoperative positions are not shown but may be analogous to the actuator means described in the earlier examples. Other features of those earlier examples, such as the bumper bars, can of course also be incorporated in this embodiment.

Roller tables used with slab casters generally are required to have a cut-off torch travel along them to cut the slabs to length. This results in slag adhesion to the rolls, which must be removed, and because of the manner in which the panels can be lowered in the example of FIG. 6, clear of the rolls, such maintenance work is facilitated. It is also possible to lower the panels sequentially along the length of the table during the operation of the cut-off torch to avoid them being damaged by the torch flame.

We claim:

1. In a roller table having a base frame, bearing supports in said base frame and rollers mounted rotatably in said bearing supports for providing a travel path for hot material along the roller table, the improvement which comprises:

(i) a plurality of displaceable heat insulating panels s across the width of the roller table and disposed below said material travel between sucessive said rollers, (ii) pivot mounting means on the base frame locating said panels thereon and defining pivot axes extending transversely to said travel path, (iii) displacements means connected to said panels for displacement of the panels on said pivot mounting means between operative and non-operative positions, (iv) said panels having upper heat re-radiating faces directed towards said travel path when the panels are in the operative position, (v) said panel upper faces being tilted downwardly away from said travel path when the panels are in the inoperative position for adjusting the temperature of material, as a whole, as it moves along said travel path, (vi) said pivot axes defined by the pivot mounting means being located below the panels when the panels are in said operative position.

2. A roller table according to claim 1 further comprising a plurality of bumper bars extending in the direction of said travel path in fixed positions below said travel path between successive said rollers, each of said bumper bars being positioned between adjacent lower panels and projecting upwardly above the upper heat-radiation faces of said panels when the panels are in their operative positions whereby the bumper bars are able to deflect distorted material travelling along said travel path away from contact with said panels, said bumper bars remaining in said fixed positions during displacement of the panels between the operative and inoperative positions.

3. A roller table according to claim 1 wherein the pivot mounting axis of each panel is offset from the panel to be located underneath a first of two successive rollers between which the panel is disposed, a periphery of said first roller being disposed close to said pivot axis.

4. A roller table according to claim 1 wherein the panels have top faces that are inclined to the horizontal in the operative position.

5. A roller table according to claim 1 wherein a fixed auxiliary heat insulating panel is disposed adjacent at least one roller of a pair of successive rollers between which pair lies at least one displaceable panel, said auxiliary panel being disposed between the displaceable panel and said one roller.

6. A roller table according to claim 1 further comprising a plurality of heat insulating panels above said travel path, and means for moving the upper panels towards and away from the path to vary their heat insulating effect on hot material on said travel path, and common heat sensing means arranged to actuate the means for moving the upper and lower panels to control the movements of said upper and lower panels.

7. A roller table according to claim 4 the inclination of each said panel top face is in the direction of tilting of the panel towards the inoperative position.

8. A roller table according to claim 5 wherein an adjacent side of said one roller is overlapped by a vertical projection of said auxiliary panel.

* * * * *